Feb. 24, 1959 M. KROFTA 2,874,842
PROCESS AND APPARATUS FOR WASTE LIQUID PURIFICATION
Filed April 5, 1955 3 Sheets-Sheet 1

INVENTOR.
MILOS KROFTA
BY Paul W. Garbo
AGENT

Feb. 24, 1959     M. KROFTA     2,874,842
PROCESS AND APPARATUS FOR WASTE LIQUID PURIFICATION
Filed April 5, 1955     3 Sheets-Sheet 3

INVENTOR.
MILOS KROFTA
BY Paul W. Garbo
AGENT

United States Patent Office 2,874,842
Patented Feb. 24, 1959

2,874,842

PROCESS AND APPARATUS FOR WASTE LIQUID PURIFICATION

Milos Krofta, Lenox, Mass.

Application April 5, 1955, Serial No. 499,326

14 Claims. (Cl. 210—70)

This invention relates to the purification of liquids containing suspended particles which can be removed by flotation. The invention pertains especially to the treatment of waste or "white" waters of paper, cellulose, wood pulp and textile plants, in which waters the suspended particles are brought to the surface by means of gas or air bubbles passing up through a body of the water.

The clarification of waste waters has been carried out in numerous types of apparatus and today the type frequently used relies on the principle of floating the particles to the surface of the water and mechanically skimming the "float" from the surface of the water to effect its separation. However, all mechanical skimmers, whether radial blades on a rotating shaft or parallel slats on an endless conveyor, are objectionable because they increase the cost of the clarification equipment and the cost of operation through the consumption of power.

An important object of this invention is to collect and remove the "float" from a waste liquid undergoing purification without the use of mechanical skimmers.

Other objects and advantages of the invention will be apparent from the description which follows.

In accordance with this invention, the waste liquid containing suspended, floatable particles is treated with a gas so that bubbles rising through the liquid entrain the particles, first along inclined surfaces toward the periphery of the body of liquid undergoing purification, and then along reversely inclined surfaces toward a common point where the gas-entrained flocs are collected and removed. A distinctive and noteworthy feature of the invention is the "reverse funnel flow" of the gas-entrained particles. That is to say, the suspended matter may be visualized as rising first along the exterior surface of an upright funnel and then along the interior surface of a superposed, inverted funnel.

To explain the invention further, reference will now be made to the accompanying drawings showing several illustrative forms of apparatus embodying the invention.

Figure 1:
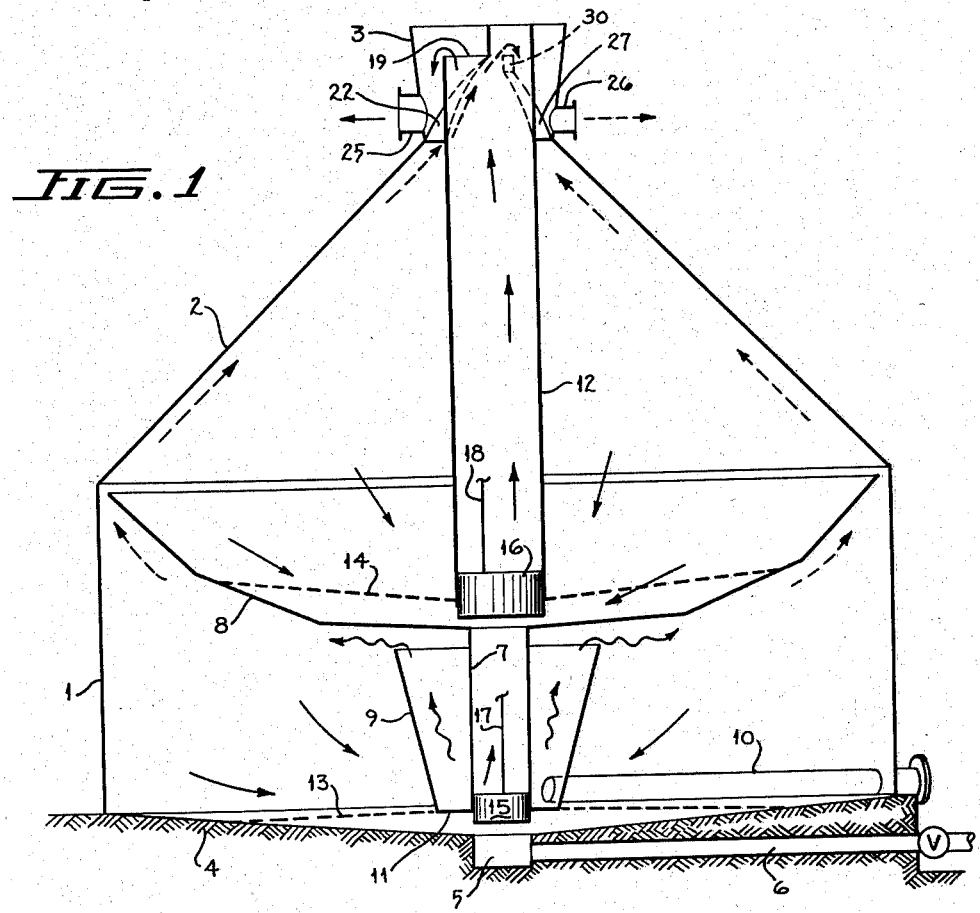
Figure 1 is a schematic sectional elevation of a white water purifier.

In Figure 1, cylindrical tank 1 carries conical top 2 terminating in generally cylindrical collar or stack 3 which has a slight outward taper in the upward direction. Tank 1 is supported on concrete foundation 4 having a floor slightly pitched toward sump 5 at the center of the tank. Duct 6 with a suitable valve is used to drain sump 5. Tube 7 is disposed upright over sump 5 with its lower end spaced therefrom. The upper end of tube 7 is joined to the bottom of bowl-like deflector 8. Baffle 9 tapering outwardly in the upward direction is concentrically arranged around tube 7. Pipe 10 passes through tank 1 and discharges the white water into the annular space between tube 7 and baffle 9. Ring 11 closes the lower end of the annular space so that the white water rises through this space and then flows radially outwardly below the bottom of deflector 8. Pipe 10 preferably enters baffle 9 along a line tangent to the circle midway between baffle 9 and tube 7 so that the white water will swirl up through the annular space within baffle 9.

Prior to entering the purifier, the white water has been treated under pressure in the known manner with air, and possibly with a chemical, so as to dissolve an appreciable amount of air in the waste water. Just before entering the purifier, the white water undergoes a decrease in pressure with the result that shortly thereafter the dissolved air is released in the form of tiny bubbles. When the white water discharges into the purifier, these bubbles seek to rise through the water and form the entraining medium for carrying up the suspended matter and effecting separation by flotation.

In Figure 1, wavy line arrows indicate the general flow of the white water in the region where the bulk of the air bubbles are being evolved, dash line arrows indicate the general flow of the air-entrained particles, and smooth line arrows indicate the general flow of the purified water. Thus, the waste water with evolving air bubbles flows up against the bottom of deflector 8 which may be substantially flat in the central portion and curved upwardly in the outer portion to facilitate the upward migration of air-entrained particles. The rising particles accumulate at the periphery of tank 1 and then reverse their flow by moving up along the inner surface of conical top 2 with the result that the floated matter is automatically brought to and collected at the apex of cone 2.

While the suspended particles move upwardly as described, relatively clean water migrates into the bottom of tank 1 and into the bottom of bowl-like reflector 8. Upright tube 12 is disposed with its lower end spaced from the bottom of bowl-like deflector 8 and its upper end extending beyond the top of cone 2. Perforated plate 13 is placed along the bottom of tank 1 around the lower end of tube 7 and a similar perforated plate 14 surrounds the lower end of tube 12 above the bottom of deflector 8. Perforated plate 13 ensures more even flow of clean water from all of the bottom of tank 1 toward withdrawal tube 7 and likewise perforated plate 14 facilitates desirable flow of clean water from the entire bottom of deflector 8 toward withdrawal tube 12. Clean water flowing up tube 7 continues to rise through tube 12 along with clarified water collecting in deflector 8 and entering the lower end of tube 12. Consequently, tube 12 has a larger diameter than tube 7. The relative proportions of clean water withdrawn at the bottom of tank 1 and at the bottom of deflector 8 are controlled, respectively, by adjustable sleeves 15 and 16 fitted in the lower ends of tubes 7 and 12. When sleeves 15 and 16 are lowered so that they rest on foundation 4 and deflector 8, respectively, the flow of water to tubes 7 and 12 is stopped. Conversely, flow occurs when either sleeve is raised and maximum flow takes place when the bottom edge of the sleeve no longer projects out of the lower end of the tube in which the sleeve is disposed. Adjustment of sleeves 15 and 16 may be achieved by means of rods 17 and 18, respectively, extending to the top of the purifier where one may pull them up or drop them as desired. Rods 17 and 18 are shown only partially to prevent obscurement of more essential parts of the apparatus. Each rod is attached to the inside of its sleeve by a suitable bracket or spider (not shown) and at least one of the two rods is eccentrically positioned so that the two rods do not interfere with one another. Rod 17 passes up through the hollow part of sleeve 16 so that sleeve 15 may be adjusted without disturbing sleeve 16.

Figure 2:
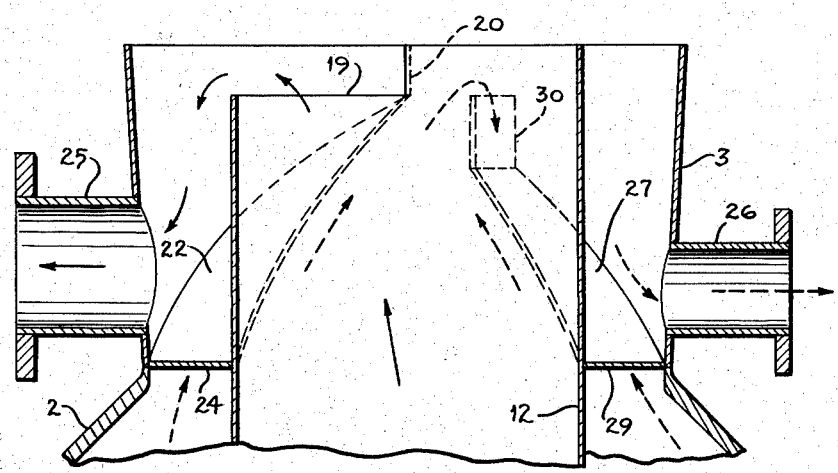
Figure 2 is an enlargement of the upper end of Figure 1
Figure 3:
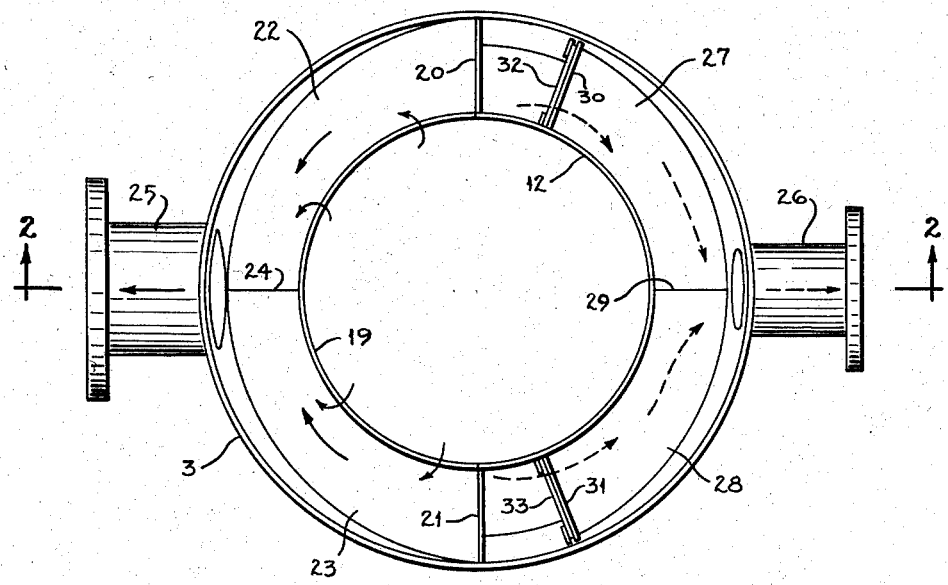
Figure 3 is a plan view based on Figure 2.

The upper end of tube 12 has a semi-circular cut-out so that the clarified water in tube 12 spills over the cut-out edge 19 into stack 3. The details of the top of the purifier are shown in Figures 2 and 3.

The annular space between stack 3 and tube 12 is divided by two vertical baffles 20 and 21 extending from the top of tube 12 to the level of cut-out edge 19. A pair of curved baffles 22 and 23 are joined to the bottom edges of baffles 20 and 21, respectively, and slope downwardly toward the bottom of stack 3 where the two baffles 22 and 23 are joined together along line 24. With this construction the clarified water flowing up tube 12 spills over cut-out edge 19, runs down curved baffles 22 and 23, and discharges from the annular space between stack 3 and tube 12 through outlet 25.

Stack 3 is also provided with outlet 26 on the side opposite that of outlet 25. A pair of curved baffles 27 and 28 are joined together along line 29 just below outlet 26 and extend upwardly through the annular space between stack 3 and tube 12 but do not reach and connect with vertical baffles 20 and 21 as do curved baffles 22 and 23. Rather, baffles 27 and 28 terminate some distance from vertical baffles 20 and 21, respectively. The upper edges of baffles 27 and 28 are connected with the lower edges of vertical baffles 30 and 31, respectively, the upper edges of which are on the same level as cut-out edge 19. The floated particles collecting at the top of cone 2 move up along the bottom surfaces of curved baffles 22, 23, 27 and 28, spill over vertical baffles 30 and 31, run down the upper surfaces of curved baffles 27 and 28, and discharge through outlet 26.

Since the "float" passing over baffles 30 and 31 has a lower hydraulic resistance to flow than the clarified water flowing up tube 12 and over cut-out edge 19, it is generally advisable to equalize the hydraulic heads of the two overflowing liquids by raising the level of the "float" slightly above that of the clean water. As shown in Figure 3, this may be done with adjustable weir plates 32 and 33 contiguous to baffles 30 and 31, respectively. Usually, weir plates 32 and 33 are raised so that the "float" flowing over them has a level approximately one inch higher than that of the clean water spilling over cut-out edge 19.

Heavy particles settling out of the waste water and collecting at the bottom of bowl-like deflector 8 and tank 1 are periodically flushed out of the purifier through sump 5 and duct 6.

Figure 4:
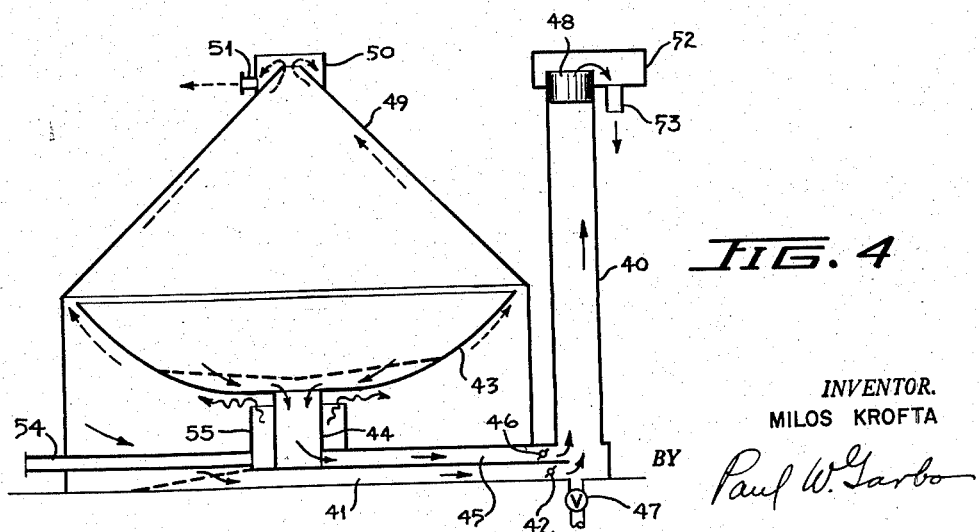
Figures 4, 5, 6 and 7 are schematic sectional elevations of four other forms of waste water purifiers.

The purifier of Figure 4 is much like that of Figure 1 except that internal tube 12 of Figure 1 for the withdrawal of clean water has been replaced in Figure 4 with external tube 40. Clean water leaves the bottom of the purifier through duct 41 provided with a butterfly valve 42 to regulate the flow while clean water passes from bowl-like deflector 43, down tube 44 and through duct 45 which has flow control valve 46. Ducts 41 and 45 discharge into tube 40. Valved drain 47 is occasionally used to flush out heavy particles settling in the purifier. In this illustration, to make the level of the "float" at the top of the purifier higher than that of the water in tube 40, an adjustable weir sleeve 48 is fitted in the upper end of tube 40. The water spilling over the top edge of weir sleeve 48 has a slightly lower level than that overflowing the top of cone 49 into stack 50. The "float" issues from stack 50 through outlet 51 while the clarified water spilling over weir sleeve 48 leaves basin 52 through outlet 53. In other respects, the purifier of Figure 4 is essentially like that of Figure 1, the white water and entraining air being introduced through pipe 54 and cylindrical baffle 55 disposed around tube 44.

Figure 5:
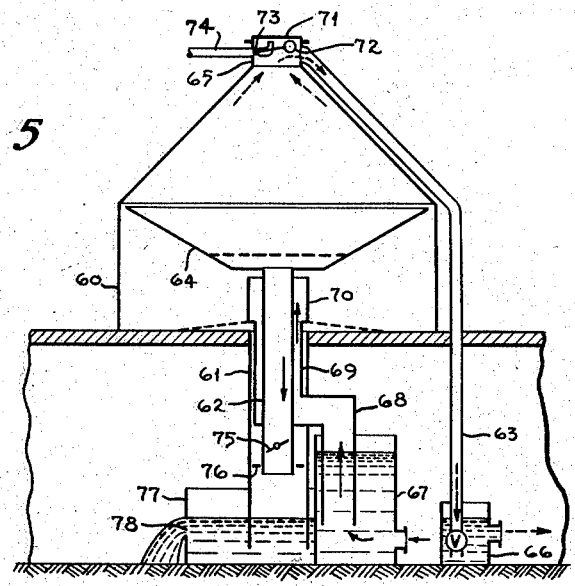

Figure 5 shows a purifier for operation at subatmospheric pressure. Tank 60 is set on an upper floor of a building and withdrawal tubes 61, 62 and 63 extend downwardly to a lower floor, acting as barometric legs to reduce the pressure in the purifier and thus facilitate the evolution of air bubbles in the white water. Clear water leaves tank 60 through tube 61 and bowl-like deflector 64 through tube 62, while the concentrated suspension of air-entrained particles flows from stack 65 through tube 63 into reclaimed stock tank 66. White water is pumped into feed tank 67 and thence passes up pipes 68 and 69 into the annular space between tube 62 and cylindrical baffle 70. Whereas the purifiers described hereinbefore are open at the top to the atmosphere, the purifier of Figure 5 has a seal cap 71 mounted on stack 65 to permit operation at reduced pressure. Excessive accumulation of gas in stack 65 is prevented by float 72 which operates to open valve 73 in gas vent pipe 74 when too much gas begins to collect in stack 65. Pipe 74 is connected to an air suction pump (not shown).

The withdrawal of clean water from bowl-like deflector 64 is controlled by damper 75 in tube 62, while similar control means 76 in the annular space between tubes 61 and 62 regulates the flow of clean water from the bottom of tank 60 by way of tube 61. All of the clean water passes from the lower end of tube 61 into seal tank 77 and discharges from outlet 78.

Figures 6, 7:
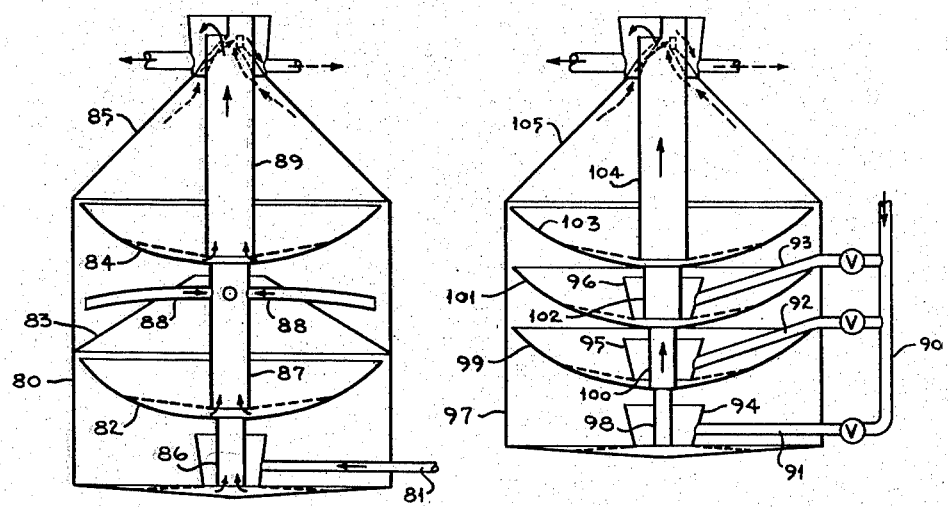

The purifier of Figure 6 has two stages for carrying out the "reverse funnel flow" principle of this invention. Gas-entrained particles rising from the waste liquid introduced into the bottom of tank 80 by way of pipe 81 move outwardly along the bottom surface of bowl-like deflector 82, then inwardly up the internal cone 83, again outwardly along the bottom surface of deflector 84, and finally inwardly up cone 85 where the collection of the suspended particles is completed. In the meantime, clarified liquid flows from the bottom of tank 80 up tube 86, from within deflector 82 up tube 87, from the space between cone 83 and deflector 84 through a plurality of radially arranged tubes 88, and from within deflector 84 up tube 89. All of the clarified liquid discharges from the upper end of tube 89 as already explained in connection with Figure 1. The "float" collecting in the top of cone 85 is also withdrawn as described for the apparatus of Figure 1. For any given horizontal cross-sectional area, the two-stage purifier of Figure 6 will handle approximately twice as much waste liquid as will the single-stage purifier of Figure 1.

Another type of multi-stage purifier is shown in Figure 7. The white water is supplied from manifold pipe 90 through valved pipes 91, 92 and 93 to distributor cups 94, 95 and 96, respectively. Clarified water flows from the bottom of tank 97 into tube 98, from within deflector 99 into tube 100, from within deflector 101 into tube 102, and from within deflector 103 into tube 104. Air-suspended flocs move outwardly beneath deflectors 99, 101 and 103, up the walls of tank 97 and into collecting cone 105. The rate at which white water enters each level of the purifier is independently regulated and it is generally advisable to have about the same rate at every level of entry. The withdrawal of clear water and concentrated stock from the top of this purifier is the same as that described in connection with Figure 1. For any given diameter, the multi-stage apparatus of Figure 7, like that of Figure 6, will clarify more gallons of waste water per minute than will the single-stage unit of Figure 1. A multi-stage purifier with several vertically spaced inlets for the white water as shown in Figure 7 will generally ensure more uniform dispersion of small gas bubbles and, therefore, better clarification of the water through flotation than a multi-stage unit with a single bottom inlet as shown in Figure 6 where the bubbles tend to enlarge as they rise through the water and become less efficient in the entrainment of suspended particles.

The purifying apparatus of this invention is provided with a slanted top which extends from the periphery of the tank portion of the apparatus upwardly toward an opening for the discharge of the floated particles. It is advisable that the slanted top of the apparatus have an inclination in the range of 30° to 60° with the horizontal so as to facilitate movement of the floated particles toward the opening whence the floated particles are discharged. The outer or peripheral portions of the bowl-like deflectors, as well as internal slanted baffles like baffle 83 of Figure 6, should also be disposed at an angle in the range of 30° to 60° with respect to the horizontal.

While in most instances, the entraining gas, usually air, used to float the suspended particles in the waste liquid, is dissolved under pressure in the liquid prior to its introduction into the purifying apparatus of this invention, it is also possible to bubble such gas directly into the apparatus in the vicinity in which the waste liquid is introduced. Also, chemical assistants, such as coagulating and fluocculating agents, may be added to the waste liquid either before it is introduced into the purifying apparatus or directly in the apparatus in the region in which the waste liquid is introduced.

To illustrate the invention further, in a specific example of apparatus as shown in Figure 1, a cylindrical tank 12.5 feet in diameter and 5 feet in height, and having a conical top making a 45° angle with the horizontal, is capable of purifying 500 gallons of white water per minute. The fiber suspended in the white water amounts to 8 pounds per thousand gallons. The clarified water withdrawn from the apparatus contains not more than 0.5 pound of fiber per thousand gallons and the floated fibers discharge from the conical top of the apparatus as a suspension in only 5% of the white water introduced into the apparatus. This amount of concentration of the floated fibers is noteworthy in view of current practice where the concentrated fibers are discharged as a suspension involving about 25 to 30% of the waste liquid undergoing purification.

It is well to note that the single-stage purifiers of Figures 1, 4 and 5 involve two superposed, separation zones in which the suspended particles are concentrated by flotation. In the purifier of Figure 1, one separation zone is at a level approximately midway between floor 4 and the bottom of deflector 8, and the other separation zone is approximately at the level where conical top 2 meets cylindrical tank 1. Generally, each of the two separation zones effects clarification of approximately one-half of the waste liquid entering the purifier. Thus, 40 to 60% of the clarified liquid will be drawn from the bottom of tank 1 and the remaining portion from within bowl-like deflector 8. The waste liquid clarifying capacity of the apparatus is proportioned to the sum of the horizontal cross-sectional areas of the two separation zones. In a typical case, each square foot of horizontal separation area will handle approximately 2.5 gallons of waste liquid per minute.

The height of the tank portion of the purifier is primarily dictated by baffle 9, which is usually 2 to 4 feet in height, and the depth of bowl-like deflector 8 which is dependent on its diameter and a sufficient slant or curvature to facilitate outward movement of the gas-entrained flocs along the bottom surface of the deflector. The annular clearance between the edge of deflector 8 and tank 1 is generally 2 to 4 inches. While cylindrical tanks and conical tops are frequently preferred, other shapes may be used. Thus, the tank may be rectangular in horizontal cross-section and the top may be quasi-pyramidal. Also, the upward slant of the top may have curvature, that is, the top may be dome-like.

The degree of concentration of the floated particles which can be achieved is related to, and controlled by, the sizes of the openings through which the clarified liquid and the "float" are discharged. In an illustrative case, referring to Figures 2 and 3, cut-out edge 19 for the discharge of purified water is 27 inches wide and baffles 30 and 31 for the discharge of the "float" are each 6 inches wide. While a high degree of concentration of the floated particles is obtained with the foregoing ratio of 27 to 12 for the widths of the overflow openings for the purified water and the "float," respectively, this ratio may be readily adjusted as desired. For instance, for a still higher degree of concentration, the upper part of weir plates 32 and 33 contiguous to baffles 30 and 31, respectively, may be notched out so that when these weir plates are raised the original width of 6 inches for each "float" overflow is decreased to, say, 4 inches.

In view of the various modifications of the invention which will occur to those skilled in the art upon consideration of the foregoing disclosure without departing from the spirit or scope thereof, only such limitations should be imposed as are indicated by the appended claims.

What is claimed is:

1. In the purification of liquids containing suspended particles by flotation of said particles, the improvement which comprises introducing a liquid containing suspended particles and pressurized gas into the lower central portion of a body of said liquid while releasing in said liquid said gas in the form of small bubbles to entrain said particles to the top of said body of said liquid, deflecting the flow of the gas-entrained particles in said lower central portion laterally in substantially all directions toward the peripheral portion of said body of said liquid, thence deflecting the flow of said gas-entrained particles upwardly in inclined directions toward a common point of withdrawal, and withdrawing purified liquid from the bottom of said body of said liquid and from a higher level in said body of said liquid above the level where the flow of said gas-entrained particles is deflected toward said peripheral portion of said body of said liquid.

2. The process of claim 1 wherein the purified liquid withdrawn from the bottom of said body of said liquid is not more than 60% by volume of the total purified liquid.

3. The process of claim 1 wherein the inclined directions are at an angle of about 30° to 60° to the horizontal.

4. Apparatus for purifying liquids containing suspended particles by flotation of said particles comprising a tank, a bowl-shaped deflector in said tank disposed with its convex surface in spaced relation to the bottom of said tank, means for introducing a liquid containing suspended particles and an entraining gas into said tank below said convex surface of said deflector, a slanted top on said tank extending from the periphery of said tank upwardly toward an opening for the discharge of floated particles, and means for withdrawing purified liquid from the bottom of said tank and from within said deflector.

5. The apparatus of claim 4 wherein the tank is cylindrical and the slanted top is a cone forming with the horizontal an angle in the range of 30° to 60°.

6. The apparatus of claim 4 wherein the means for withdrawing purified liquid from the bottom of said tank comprises a tube in communication with said bottom and extending upwardly through the bowl-shaped deflector.

7. The apparatus of claim 6 wherein the means for introducing the liquid comprises an upwardly open cup disposed below the bowl-shaped deflector and around the tube extending upwardly through said deflector, and a pipe for discharging said liquid into the lower portion of said cup.

8. The apparatus of claim 4 wherein the means for withdrawing purified liquid from the bottom of the tank and from within the bowl-shaped deflector comprises a vertical tube with its lower end in communication with said bottom and its upper end forming a funnel-shaped structure with said deflector, and a second vertical tube with its lower end in communication with liquid in said deflector and its upper end projecting through the slanted top.

9. Apparatus for purifying liquids containing suspended particles comprising a tank, a series of vertically spaced bowl-shaped deflectors in said tank disposed with their convex surfaces facing downwardly and with the lowermost convex surface in spaced relation to the bottom of said tank, means for introducing a liquid containing suspended particles and an entraining gas into said tank below said lowermost convex surface, a slanted top on said tank extending from the periphery of said tank upwardly toward an opening for the discharge of floated particles, and means for withdrawing purified liquid from the bottom of said tank and from within each of said deflectors.

10. The apparatus of claim 8 wherein the means for withdrawing purified liquid from the bottom of said tank comprises a tube in communication with said bottom and extending upwardly through the lowermost bowl-shaped deflector, and the means for withdrawing purified liquid from the uppermost bowl-shaped deflector comprises a second tube in communication with the lower portion of said uppermost bowl-shaped deflector and extending upwardly through the slanted top.

11. The apparatus of claim 9 wherein a slanted baffle is disposed in the space between two succeeding deflectors, said baffle extending from the periphery of the tank upwardly toward an opening adjacent the bottom of the higher of said two succeeding deflectors.

12. The apparatus of claim 9 wherein means for introducing an additional quantity of said liquid and entraining gas is disposed to discharge said liquid and entraining gas below one of the deflectors other than the lowermost deflector.

13. A process for purifying liquids containing suspended particles by flotation of said particles, which comprises introducing a liquid containing suspended particles and small gas bubbles into the central portion of a mass of said liquid having an appreciable horizontal cross-sectional area for flotation separation, withdrawing a first purified portion of said liquid from the bottom portion of said mass, flowing another portion of said liquid with gas-entrained particles from said central portion of said mass radially upward to substantially all of the top peripheral portion of said mass and thence into substantially all of the bottom peripheral portion of a superposed mass of said liquid having an appreciable horizontal cross-sectional area for flotation separation, directing said gas-entrained particles from said bottom peripheral portion radially upward to the top portion of said superposed mass, withdrawing a second purified portion of said liquid from the central bottom portion of said superposed mass, and withdrawing said gas-entrained particles from said top portion of said superposed mass.

14. The process of claim 13 wherein the first and second purified portions of said liquid are each in the range of 40 to 60% by volume of the total purified liquid.

References Cited in the file of this patent

UNITED STATES PATENTS

| | | |
|---|---|---|
| Re. 21,109 | Sayers et al. | June 6, 1939 |
| 826,411 | Elmore | July 17, 1909 |
| 1,717,223 | Karlstrom | June 11, 1929 |
| 1,851,172 | Gordon | Mar. 29, 1932 |
| 2,122,310 | Burt | June 28, 1938 |
| 2,439,633 | Reinhart | Apr. 13, 1948 |
| 2,446,655 | Lawrason | Aug. 10, 1948 |

FOREIGN PATENTS

| | | |
|---|---|---|
| 124,551 | Great Britain | Mar. 24, 1919 |

UNITED STATES PATENT OFFICE

CERTIFICATE OF CORRECTION

Patent No. 2,874,842                             February 24, 1959

Milos Krofta

It is hereby certified that error appears in the printed specification of the above numbered patent requiring correction and that the said Letters Patent should read as corrected below.

Column 7, line 14, for the claim reference numeral "8" read -- 9 --.

Signed and sealed this 23rd day of June 1959.

(SEAL)
Attest:
KARL H. AXLINE
Attesting Officer

ROBERT C. WATSON
Commissioner of Patents